US012715059B2

(12) United States Patent
Yoshimoto et al.

(10) Patent No.: US 12,715,059 B2
(45) Date of Patent: Aug. 25, 2026

(54) WELD-LINE GENERATING APPARATUS, METHOD FOR GENERATING WELD LINE, AND PROGRAM FOR GENERATING WELD LINE

(71) Applicant: Kobe Steel, Ltd., Kobe (JP)

(72) Inventors: Tatsuya Yoshimoto, Kobe (JP); Akira Okamoto, Kobe (JP); Tsuyoshi Ashida, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 1098 days.

(21) Appl. No.: 17/808,570

(22) Filed: Jun. 24, 2022

(65) Prior Publication Data

US 2023/0043697 A1 Feb. 9, 2023

(30) Foreign Application Priority Data

Aug. 3, 2021 (JP) ................................ 2021-127326

(51) Int. Cl.
*B23K 9/127* (2006.01)
*B23K 9/095* (2006.01)
(Continued)

(52) U.S. Cl.
CPC .......... *B23K 9/1274* (2013.01); *B23K 9/0953* (2013.01); *B23K 26/24* (2013.01);
(Continued)

(58) Field of Classification Search
CPC .... B23K 9/0953; B23K 9/1274; B23K 26/24; B23K 2103/04; G06T 7/70; G06T 7/0004;
(Continued)

(56) References Cited

U.S. PATENT DOCUMENTS

2012/0029674 A1* 2/2012 Hida ..................... B23K 9/127 700/98
2012/0029874 A1 2/2012 Masatoshi et al.
(Continued)

FOREIGN PATENT DOCUMENTS

JP 2010-184278 A 6/2010
JP 2018-156566 A 10/2018
(Continued)

*Primary Examiner* — Brian W Jennison

(74) *Attorney, Agent, or Firm* — Oblon, McClelland, Maier & Neustadt, L.L.P.

(57) ABSTRACT

A weld-line generating apparatus includes a point-cloud-data acquiring unit that acquires 3D point cloud data of workpieces to be welded that are arranged in a predetermined space, an edge extracting unit that extracts 3D point cloud data of edges from the 3D point cloud data acquired by the point-cloud-data acquiring unit, a workpiece point-cloud-data generating unit that generates a 3D point cloud data component of each of the workpiece based on 3D point cloud data that is obtained by removing the 3D point cloud data of edges extracted by the edge extracting unit from the 3D point cloud data acquired by the point-cloud-data acquiring unit, and a weld-line generating unit 24 that generates weld lines for the workpieces based on the 3D point cloud data components of the workpieces generated by the workpiece point-cloud-data generating unit.

6 Claims, 5 Drawing Sheets

(51) Int. Cl.

| | |
|---|---|
| ***B23K 26/24*** | (2014.01) |
| ***B23K 103/04*** | (2006.01) |
| ***G06T 7/00*** | (2017.01) |
| ***G06T 7/13*** | (2017.01) |
| ***G06T 7/70*** | (2017.01) |

(52) U.S. Cl.
CPC .............. *G06T 7/0004* (2013.01); *G06T 7/13* (2017.01); *G06T 7/70* (2017.01); *B23K 2103/04* (2018.08); *G06T 2207/10028* (2013.01); *G06T 2207/30136* (2013.01); *G06T 2207/30152* (2013.01); *G06T 2207/30164* (2013.01)

(58) Field of Classification Search
CPC . G06T 2207/10028; G06T 2207/30136; G06T 2207/30164
See application file for complete search history.

(56) References Cited

U.S. PATENT DOCUMENTS

| | | | | |
|---|---|---|---|---|
| 2013/0119040 | A1* | 5/2013 | Suraba ................. | B23K 9/0953 219/136 |
| 2018/0117701 | A1* | 5/2018 | Ge ....................... | B23K 9/1272 |
| 2020/0114449 | A1* | 4/2020 | Chang .................. | B23K 9/0956 |

FOREIGN PATENT DOCUMENTS

| | | | |
|---|---|---|---|
| JP | 2021-13947 | A | 2/2021 |
| KR | 10-2019-0121329 | A | 10/2009 |
| KR | 10-2125167 | B1 | 8/2020 |

* cited by examiner

S
INPUT UNIT
OUTPUT UNIT
IF UNIT
STORAGE UNIT
CONTROL PROCESSING UNIT
CONTROL UNIT
EDGE EXTRACTING UNIT
WORKPIECE POINT-CLOUD-DATA GENERATING UNIT
WELD-LINE GENERATING UNIT
TEACHING-DATA GENERATING UNIT
FIRST WELD-LINE EXCLUDING UNIT
SECOND WELD-LINE EXCLUDING UNIT
WELD-LINE INTEGRATING UNIT
POINT-CLOUD-DATA ACQUIRING UNIT (e.g. ToF CAMERA, LiDAR, IF)

WELD-LINE GENERATING APPARATUS, METHOD FOR GENERATING WELD LINE, AND PROGRAM FOR GENERATING WELD LINE

BACKGROUND OF THE INVENTION

1. Field of the Invention

The present invention relates to a weld-line generating apparatus that generates weld lines for a plurality of workpieces to be welded, a method for generating a weld line, and a program for generating a weld line.

2. Description of the Related Art

With development of articulated robots such as, for example, vertical six-axis robots, welding torches have been attached to ends of robot arms, and automation of welding has been advanced. This type of articulated robot operates in accordance with motion data (a motion program, teaching data, a teaching program) regarding a motion that is taught beforehand. It is necessary to generate the motion data for the above-mentioned automation of welding, and accordingly, automatic generation of a weld line is desired, and for example, there is a technology that is disclosed in Japanese Unexamined Patent Application Publication No. 2018-156566.

The weld-pass determining method disclosed in Japanese Unexamined Patent Application Publication No. 2018-156566 is a weld-pass determining method for determining a weld pass for welding at least two target members that form part of a hull and that are to be welded together. The weld-pass determining method includes a step of determining, from the shapes of the target members that are included in three-dimensional (3D) CAD data, a first target member and a second target member that may come into contact with each other, a step of extracting a first surface of the second target member that comes into contact with a surface of the first target member and that has a normal vector parallel to the normal vector of the surface of the first target member, a step of extracting a second surface of the second target member, a step of extracting a common edge that is shared by the first surface and the second surface, and a step of determining a weld pass for welding the first and second target members in accordance with the common edge.

The weld-pass determining method disclosed in Japanese Unexamined Patent Application Publication No. 2018-156566 requires 3D CAD data beforehand, and thus, there is room for improvement in this respect. Although an operator (a user) may manually generate the motion data, it takes time (workload) to generate the motion data, and when the operator is unskilled, the operator is likely to make a mistake during the generation of the motion data.

SUMMARY OF THE INVENTION

Accordingly, it is an object of the present invention to provide a weld-line generating apparatus, a weld-line generating method, and a weld-line generating program capable of automatically generating a weld line without requiring three-dimensional CAD data.

As a result of various studies, the inventor of the present invention found that the above object can be achieved by the present invention which will be described below. A weld-line generating apparatus according to an aspect of the present invention includes a point-cloud-data acquiring unit that acquires three-dimensional (3D) point cloud data of a plurality of workpieces that are to be welded together and that are arranged in a predetermined space, an edge extracting unit that extracts 3D point cloud data of edges from the 3D point cloud data acquired by the point-cloud-data acquiring unit, a workpiece point-cloud-data generating unit that generates a 3D point cloud data component of each of the plurality of workpieces based on 3D point cloud data that is obtained by removing the 3D point cloud data of edges extracted by the edge extracting unit from the 3D point cloud data acquired by the point-cloud-data acquiring unit, and a weld-line generating unit that generates weld lines for the plurality of workpieces based on the 3D point cloud data components of the plurality of workpieces generated by the workpiece point-cloud-data generating unit.

The weld-line generating apparatus generates a weld line on the basis of 3D point cloud data of a plurality of workpieces that are to be welded together, and thus, a weld line can be automatically generated without requiring three-dimensional (3D) CAD data.

In another aspect, in the weld-line generating apparatus, the weld-line generating unit performs, on all the pairs of the workpieces included in the 3D point cloud data components of the plurality of workpieces generated by the workpiece point-cloud-data generating unit, determination processing for selecting the 3D point cloud data of each pair of the workpieces from the 3D point cloud data components of the plurality of workpieces generated by the workpiece point-cloud-data generating unit and determining any one of the selected pairs of workpieces as two adjacent workpieces having adjacent end portions when a distance between the end portions of the pair of workpieces is equal to or smaller than a predetermined threshold and generates the weld line between the adjacent end portions of the two adjacent workpieces determined through the determination processing.

The weld-line generating apparatus can determine two adjacent workpieces having adjacent end portions and automatically generate a weld line.

In another aspect, in the weld-line generating apparatus, the weld-line generating unit performs, on each pair of the adjacent workpieces determined through the determination processing, generating processing for generating candidate points of a weld line between end points of an end portion of one of the pair of workpieces and end points of an end portion of another one of the pair of workpieces each of which is closest to a corresponding one of the end points of the one workpiece and generating a fitting line that fits the generated candidate points as the weld line. Preferably, in the weld-line generating apparatus, the weld-line generating unit generates candidate points of a weld line at the center position (midpoint position) between the end point and the other end point closest to the end point.

The weld-line generating apparatus can generate a weld line by a fitting line that fits each candidate point.

In another aspect, in the weld-line generating apparatus, when the fitting line includes an inflection point, the weld-line generating unit separates the candidate points used for generating the fitting line into groups while the inflection point is serving as a boundary and generates, for each group, a fitting straight line that fits the candidate points included in the group as the weld line.

The weld-line generating apparatus regenerates a weld line as a plurality of weld lines by dividing a fitting line used for generating the weld line into portions at an inflection point, and thus, a more appropriate weld line according to the shape of an end portion of a workpiece can be generated.

In another aspect, the weld-line generating apparatus further includes a weld-line excluding unit that removes a weld line having a length that is equal to or smaller than a predetermined second threshold from weld lines generated by the weld-line generating unit. Preferably, the weld-line generating apparatus further includes an input unit that receives an input of the second threshold, and the weld-line excluding unit uses the second threshold received by the input unit.

The weld-line generating apparatus further includes the weld-line excluding unit, and thus, a weld line that is unlikely to be used in actual welding can be eliminated.

In another aspect, the weld-line generating apparatus further includes a second weld-line excluding unit that removes a weld line that is present outside a predetermined area from weld lines generated by the weld-line generating unit. Preferably, the weld-line generating apparatus further includes a second input unit that receives an input of the area, and the second weld-line excluding unit uses the area received by the second input unit.

The weld-line generating apparatus further includes the second weld-line excluding unit, and thus, a weld line that is unlikely to be used in actual welding can be eliminated.

In another aspect, the weld-line generating apparatus further includes a weld-line integrating unit that connects and integrates one of weld lines generated by the weld-line generating unit and another one of the weld lines generated by the weld-line generating unit into a single weld line when a distance between a first end point of the one weld line and a second end point of the other weld line is equal to or smaller than a predetermined third threshold.

The weld-line generating apparatus further includes the weld-line integrating unit, and thus, a more appropriate weld line can be generated.

A weld-line generating method according to an aspect of the present invention includes a point-cloud-data acquiring step of acquiring three-dimensional (3D) point cloud data of a plurality of workpieces that are to be welded together and that are arranged in a predetermined space, an edge extracting step of extracting 3D point cloud data of edges from the 3D point cloud data acquired in the point-cloud-data acquiring step, a workpiece point-cloud-data generating step of generating a 3D point cloud data component of each of the plurality of workpieces based on 3D point cloud data that is obtained by removing the 3D point cloud data of the edges extracted in the edge extracting step from the 3D point cloud data acquired in the point-cloud-data acquiring step, and a weld-line generating step of generating weld lines for the plurality of workpieces based on the 3D point cloud data components of the plurality of workpieces generated in the workpiece point-cloud-data generating step.

A weld-line generating program according to an aspect of the present invention is a program causing a computer to execute a process, the process including a point-cloud-data acquiring step of acquiring three-dimensional (3D) point cloud data of a plurality of workpieces that are to be welded together and that are arranged in a predetermined space, an edge extracting step of extracting 3D point cloud data of edges from the 3D point cloud data acquired in the point-cloud-data acquiring step, a workpiece point-cloud-data generating step of generating a 3D point cloud data component of each of the plurality of workpieces based on 3D point cloud data that is obtained by removing the 3D point cloud data of the edges extracted in the edge extracting step from the 3D point cloud data acquired in the point-cloud-data acquiring step, and a weld-line generating step of generating weld lines for the plurality of workpieces based on the 3D point cloud data components of the plurality of workpieces generated in the workpiece point-cloud-data generating step.

The weld-line generating method and the weld-line generating program generate a weld line on the basis of 3D point cloud data of a plurality of workpieces that are to be welded together, and thus, a weld line can be automatically generated without requiring 3D CAD data.

A weld-line generating apparatus, a weld-line generating method, and a weld-line generating program according to the present invention can automatically generate a weld line without requiring three-dimensional CAD data.

DESCRIPTION OF THE PREFERRED EMBODIMENTS

Figure 1:
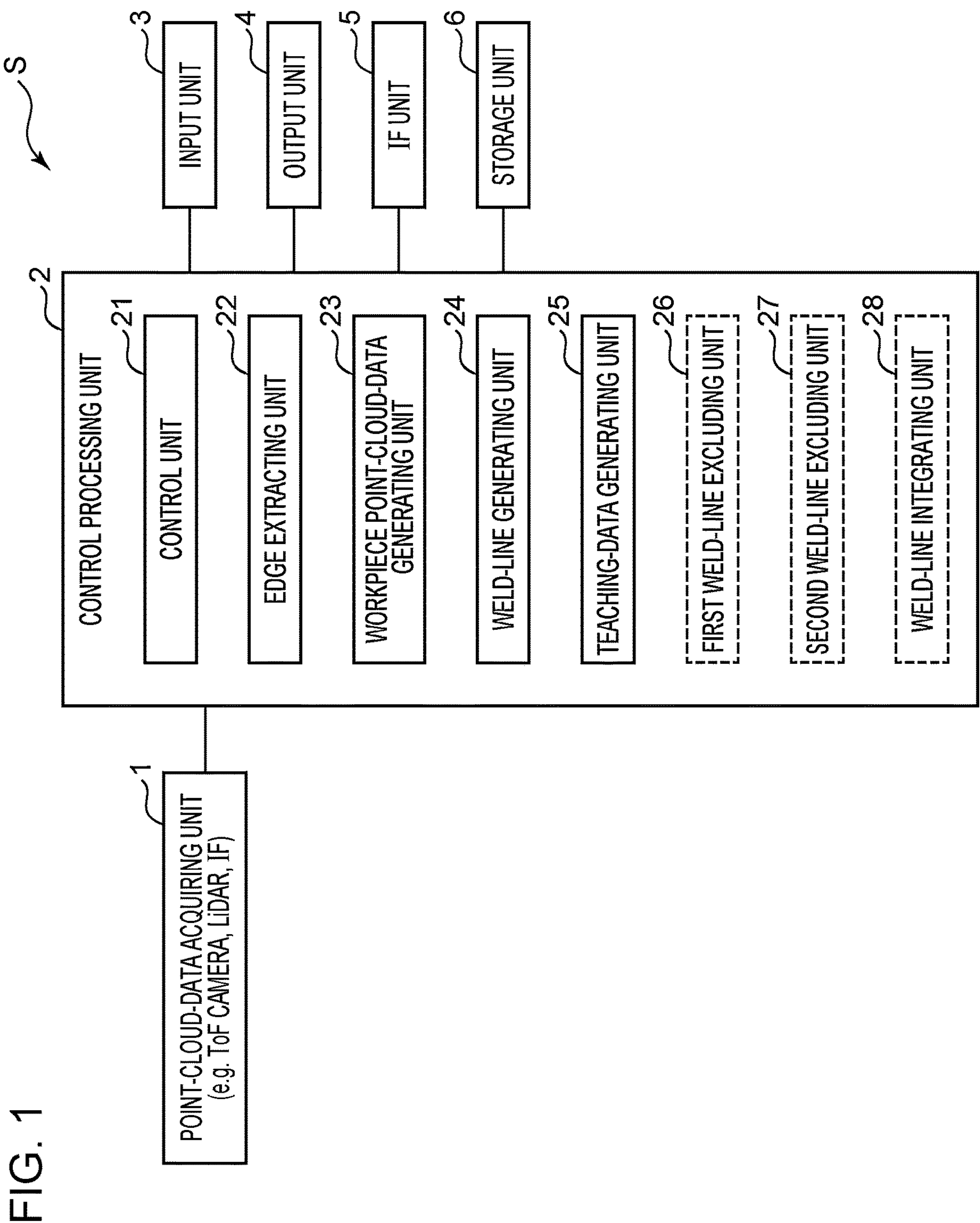
FIG. 1 is a block diagram illustrating the configuration of a weld-line generating apparatus according to an embodiment.

One or more embodiments of the present invention will be described below with reference to the drawings. However, the scope of the present invention is not limited to the one or more embodiments disclosed herein. Note that, the same components in the drawings are denoted by the same reference signs, and repeated descriptions will be suitably omitted. In the present specification, components are denoted by a reference sign without suffixes when they are collectively called, and the components are denoted by the reference sign with suffixes when they are individually described.

A weld-line generating apparatus according to the embodiment is an apparatus that generates weld lines for a plurality of workpieces to be welded. This weld-line generating apparatus includes a point-cloud-data acquiring unit that acquires three-dimensional (3D) point cloud data of a plurality of workpieces to be welded that are arranged in a predetermined space, an edge extracting unit that extracts 3D point cloud data of edges from the 3D point cloud data acquired by the point-cloud-data acquiring unit, a workpiece point-cloud-data generating unit that generates a 3D point cloud data component of each of the plurality of workpieces on the basis of 3D point cloud data that is obtained by removing the 3D point cloud data of edges, which is extracted by the edge extracting unit, from the 3D point cloud data acquired by the point-cloud-data acquiring unit, and a weld-line generating unit that generates weld lines for the plurality of workpieces on the basis of the 3D point cloud data components of the plurality of workpieces, which are generated by the workpiece point-cloud-data generating unit.

Such a weld-line generating apparatus, a weld-line generating method that is employed by the weld-line generating apparatus, and a weld-line generating program that is employed by the weld-line generating apparatus will now be described more specifically.

Figure 2:
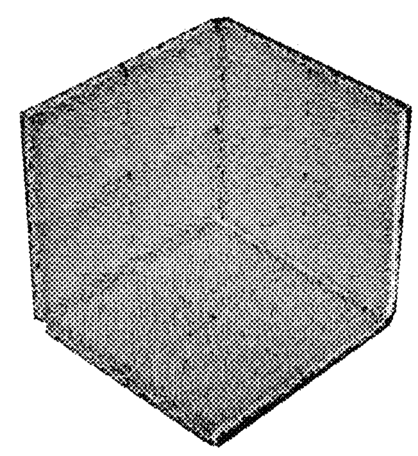
FIG. 2 is a diagram illustrating 3D point cloud data of workpieces as an example.
Figure 3:
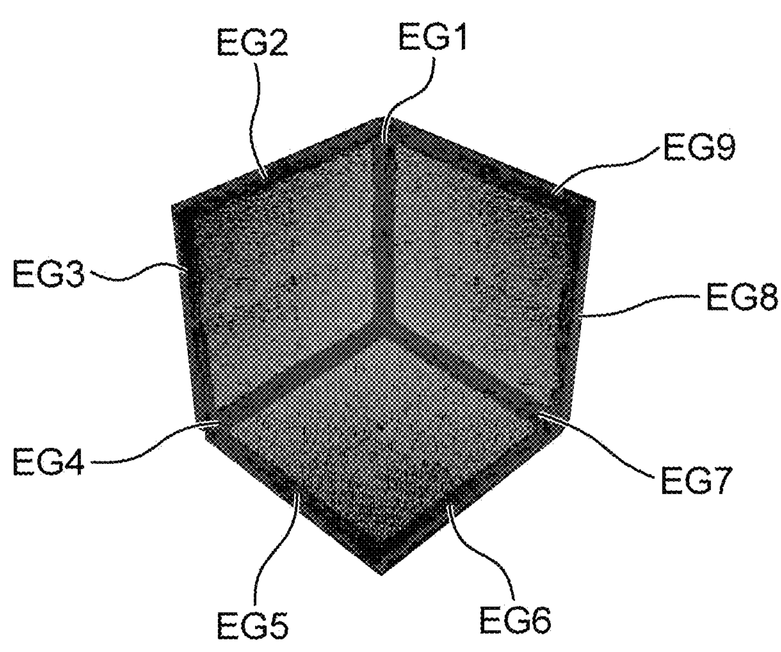
FIG. 3 is a diagram illustrating edges that are detected from the 3D point cloud data illustrated in FIG. 2.
Figure 4:
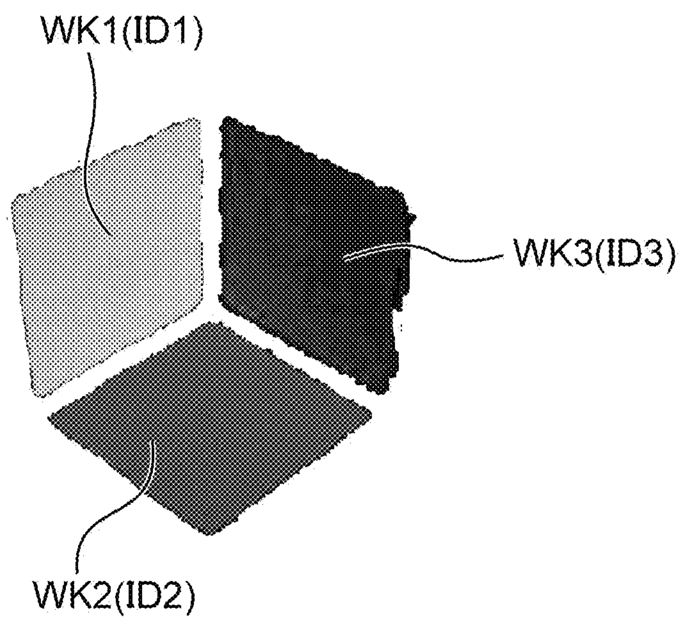
FIG. 4 is a diagram illustrating 3D point cloud data of the workpieces that is generated on the basis of the 3D point cloud data illustrated in FIG. 2.
Figure 5:
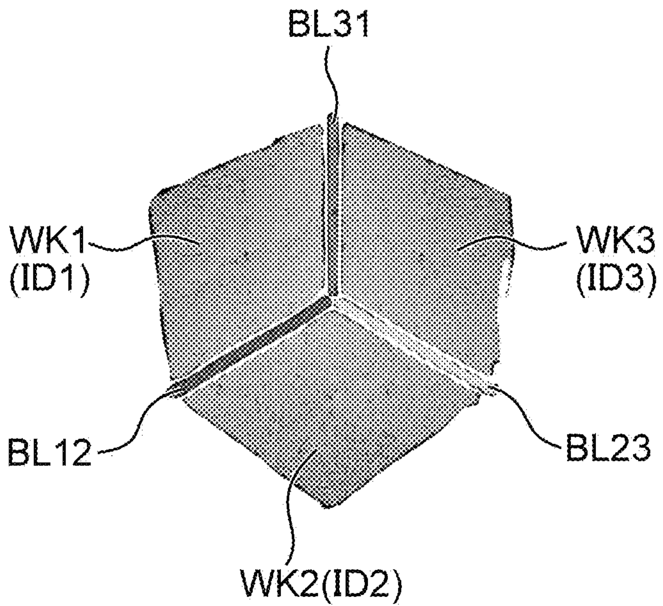
FIG. 5 is a diagram for describing two adjacent workpieces having adjacent ends.
Figure 6:
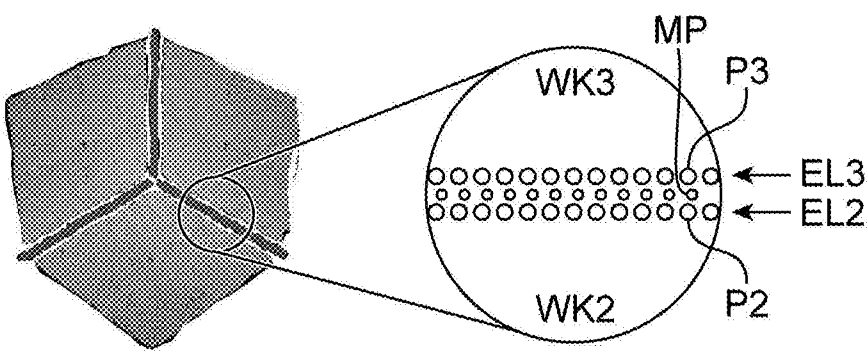
FIG. 6 is a diagram illustrating a candidate point of a weld line that is generated on the basis of the 3D point cloud data illustrated in FIG. 2.
Figure 7:
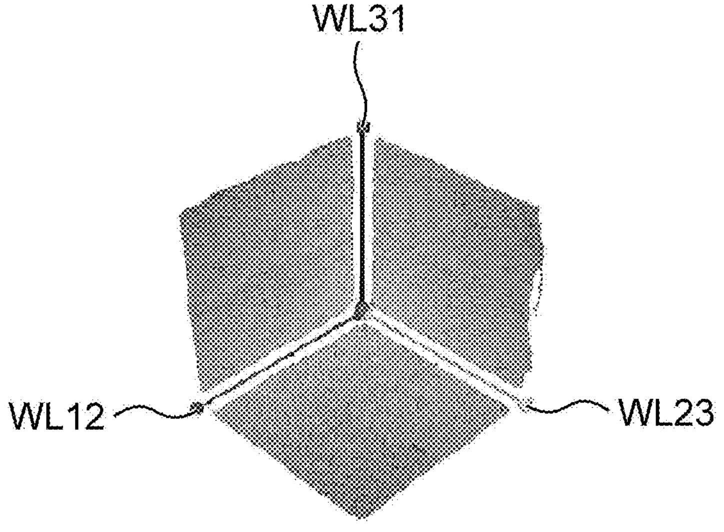
FIG. 7 is a diagram illustrating a weld line that is generated on the basis of the 3D point cloud data illustrated in FIG. 2.

FIG. 1 is a block diagram illustrating the configuration of a weld-line generating apparatus according to the embodiment. FIG. 2 is a diagram illustrating 3D point cloud data of workpieces as an example. FIG. 3 is a diagram illustrating edges that are detected from the 3D point cloud data illustrated in FIG. 2. FIG. 4 is a diagram illustrating 3D point cloud data of the workpieces that is generated on the basis of the 3D point cloud data illustrated in FIG. 2. FIG. 5 is a diagram for describing two adjacent workpieces having adjacent ends. FIG. 6 is a diagram illustrating a candidate point of a weld line that is generated on the basis of the 3D point cloud data illustrated in FIG. 2. FIG. 7 is a diagram illustrating a weld line that is generated on the basis of the 3D point cloud data illustrated in FIG. 2.

As illustrated in FIG. 1, a weld-line generating apparatus S according to the embodiment includes, for example, a point-cloud-data acquiring unit 1, a control processing unit 2, an input unit 3, an output unit 4, an interface unit (IF unit) 5, and a storage unit 6.

The point-cloud-data acquiring unit 1 is connected to the control processing unit 2 and is a unit that acquires, under control of the control processing unit 2, 3D point cloud data of a plurality of target workpieces that are to be welded together and that are arranged in a predetermined space. The point-cloud-data acquiring unit 1 outputs the acquired 3D point cloud data of the plurality of workpieces to the control processing unit 2. The plurality of target workpieces may be any weldable members such as, for example, steel sheets. The 3D point cloud data includes the three-dimensional coordinate values of each point when a surface of an object is represented by a set of points. The point-cloud-data acquiring unit 1 is, for example, a point-cloud-data generating unit such as a Time-of-Flight (ToF) camera, a stereo camera, and light detection and ranging or laser imaging detection and ranging (LiDAR) that generates 3D point cloud data of an object. Here, in the case where the target workpieces are larger than the area in which data is obtainable by a ToF camera or the like, a 3D point cloud data component is generated for each portion of the workpieces, and these 3D point cloud data components are integrated with one another.

Note that the point-cloud-data acquiring unit 1 may generate 3D point cloud data of an object by a light-section method of causing slit light to scan in a direction perpendicular to the direction in which the slit light extends. Alternatively, for example, the point-cloud-data acquiring unit 1 may be an interface circuit that inputs and outputs data to and from an external device, and in this case, the external device is a storage medium that stores the 3D point cloud data of the plurality of target workpieces, which are arranged in the predetermined space. The storage medium is, for example, a universal serial bus (USB) memory, an SD card (Registered Trademark), or the like. Alternatively, for example, the point-cloud-data acquiring unit 1 may be a drive device that reads data from a recording medium on which the 3D point cloud data of the plurality of target workpieces, which are arranged in the predetermined space, is recorded, and in this case, the recording medium is, for example, a compact disc read-only memory (CD-ROM), a compact disc recordable (CD-R), a digital versatile disc read-only memory (DVD-ROM), a digital versatile disc recordable (DVD-R), or the like. Alternatively, for example, the point-cloud-data acquiring unit 1 may be a communication interface circuit that transmits and receives a communication signal to and from an external device, and in this case, the external device is a server device that is connected to the communication interface circuit via a network (including a wide area network (WAN), a local area network (LAN), and the like) and that manages the 3D point cloud data of the plurality of target workpieces, which are arranged in the predetermined space.

The input unit 3 is connected to the control processing unit 2 and is, for example, a unit that inputs, to the weld-line generating apparatus S, various commands such as a command to start generation of a weld line and various data items that include the file name of a weld line and that are necessary for causing the welding line generator S to operate, and for example, the input unit 3 includes a plurality of input switches each of which has a preassigned function or is a keyboard, a mouse, or the like. The output unit 4 is connected to the control processing unit 2 and is a unit that outputs, under control of the control processing unit 2, a command or data that is input from the input unit 3, a generated weld line, and so forth. The output unit 4 is, for example, a display unit such as a cathode-ray tube (CRT) display, a liquid crystal display, or an electro luminescence (EL) display or a printing unit such as a printer.

Note that a so-called touch panel may be formed of the input unit 3 and the output unit 4. In the case where such a touch panel is formed, the input unit 3 is, for example, a resistive pointing device, a capacitive pointing device, or the like that performs an input operation by detecting an operated position, and the output unit 4 is a display device. In the case of this touch panel, the pointing device is provided on a display surface of the display device, and one or a plurality of input content candidates that can be input are displayed on the display device. When a user touches a portion of the display surface, the portion displaying an input content that the user desires to input, the position of the touched portion is detected by the pointing device, and the display content that is displayed at the detected position is input to the weld-line generating apparatus S as the input content that the user desires to input. With such a touch panel, a user can easily and intuitively understand an input operation, and thus, the weld-line generating apparatus S that is easy for a user to handle is provided.

The IF unit 5 is connected to the control processing unit 2 and is a circuit that inputs and outputs data to and from an external device under control of the control processing unit 2. For example, the IF unit 5 is an RS-232C interface circuit, which is an interface circuit employing a serial communication system, an interface circuit that employs the Bluetooth (Registered Trademark) standard, an interface circuit that performs an infrared communication conforming to, for example, the Infrared Data Association (IrDA) standard, an interface circuit that employs a universal serial bus (USB) standard, or the like. In addition, the IF unit 5 is a circuit that communicates with an external device and may be, for example, a data communication card, a communication interface circuit conforming to the IEEE802.11 standard, or the like.

Note that, in the case where the point-cloud-data acquiring unit 1 is an interface circuit or a communication interface circuit, the IF unit 5 may also be used as the point-cloud-data acquiring unit 1.

The storage unit 6 is connected to the control processing unit 2 and is a circuit that stores various predetermined programs and various predetermined data items under control of the control processing unit 2. The various predetermined programs include, for example, a control processing program. The control processing program include, for example, a control program for controlling the units 1 and 3 to 6 of the weld-line generating apparatus S, an edge extracting program for extracting 3D point cloud data of edges from the 3D point cloud data that is acquired by the point-cloud-data acquiring unit 1, a workpiece point-cloud-data generating program for generating a 3D point cloud data component of each of the plurality of workpieces on the basis of the 3D point cloud data that is obtained by removing the 3D point cloud data of edges, which is extracted by the edge extracting program, from the 3D point cloud data acquired by the point-cloud-data acquiring unit 1, a weld-line generating program for generating weld lines for the plurality of workpieces on the basis of the 3D point cloud data components of the plurality of workpieces, which are generated by the workpiece point-cloud-data generating program, and a teaching data generating program for generating teaching data (motion data) for causing an articulated robot with a welding torch to operate on the basis of the weld lines, which are generated by the weld-line generating program. The various predetermined data items include, for example, data items that are necessary for execution of the above-mentioned programs. The above-described storage unit 6 includes, for example, a read only memory (ROM), which is a non-volatile memory device, an electrically erasable and programmable read only memory (EEPROM), which is a rewritable non-volatile memory device, or the like. In addition, the storage unit 6 includes a random access memory (RAM) that serves as a so-called working memory of the control processing unit 2 that stores, for example, data that is generated during execution of the predetermined programs. The storage unit 6 may include a hard disk device having a relatively large storage capacity.

The control processing unit 2 is a circuit for controlling each of the units 1 and 3 to 6 of the weld-line generating apparatus S in accordance with the function of the unit, generating weld lines for a plurality of workpieces that are to be welded together and that are arranged in a predetermined space on the basis of 3D point cloud data of the plurality of workpieces, and generating teaching data on the basis of the generated weld lines. The control processing unit 2 includes, for example, a central processing unit (CPU) and the peripheral circuits. As a result of executing a control processing program, the control processing unit 2 functionally includes a control unit 21, an edge extracting unit 22, a workpiece point-cloud-data generating unit 23, a weld-line generating unit 24, and a teaching-data generating unit 25.

The control unit 21 controls each of the units 1 and 3 to 6 of the weld-line generating apparatus S in accordance with the function of the unit and is in charge of overall control of the weld-line generating apparatus S. The control unit 21 stores 3D point cloud data that is acquired by the point-cloud-data acquiring unit 1 into the storage unit 6.

The edge extracting unit 22 extracts 3D point cloud data of edges from the 3D point cloud data that is acquired by the point-cloud-data acquiring unit 1. More specifically, first, the edge extracting unit 22 performs preprocessing for removing so-called noise and an outlier from the 3D point cloud data that is acquired by the point-cloud-data acquiring unit 1 by a commonly known method such as smoothing filters. Then, the edge extracting unit 22 extracts edges from the 3D point cloud data that has undergone preprocessing by a commonly known method. This processing for extracting edges is disclosed in, for example, D. Bazazian, J. R. Casas and J. Ruiz-Hidalgo, "Fast and Robust Edge Extraction in Unorganized Point Clouds," 2015 International Conference on Digital Image Computing: Techniques and Applications (DICTA), 2015, pp. 1-8, doi: 10.1109/DICTA.2015.7371262. For example, although normal lines each of which passes through one of the points included in a point cloud are parallel to each other on a plane, these normal lines are disordered in such a manner as to intersect each other at an edge. Thus, an edge can be detected by evaluating the normal line of each point.

The workpiece point-cloud-data generating unit 23 generates a 3D point cloud data component of each of the plurality of workpieces on the basis of 3D point cloud data that is obtained by removing the 3D point cloud data of edges extracted by the edge extracting unit 22 from the 3D point cloud data that is acquired by the point-cloud-data acquiring unit 1.

For example, workpieces that are to be welded together are a first workpiece that has an upright rectangular (square) shape, a second workpiece that is in contact with a lower end (lower edge) of the first workpiece and that serves as a bottom plate, and a third workpiece that is in contact with a side end (side edge) of the first workpiece and an end portion (edge) of the second workpiece that is adjacent to another end portion (edge) of the second workpiece that is in contact with the first workpiece, the first to third workpieces having the same shape, the point-cloud-data acquiring unit 1 acquires 3D point cloud data of the first to third workpieces, which is illustrated in FIG. 2. The edge extracting unit 22 extracts edges from the 3D point cloud data illustrated in FIG. 2, so that nine edges that are first to ninth edges EG1 to EG9 are extracted as illustrated in FIG. 3. The first to fourth edges EG1 to EG4 correspond to the four edges of the first workpiece. The fourth to seventh edges EG4 to EG7 correspond to the four edges of the second workpiece. The seventh to ninth edges EG7 to E9 correspond to the four edges of the third workpiece. The first to ninth edges EG1 to EG9 that are extracted include edges EG that are located between members to be welded together such as the first, fourth, and seventh edges EG1, EG4, and EG7 and also include the remaining edges EG including the second, third, fifth, sixth, eighth, and ninth edges EG2, EG3, EG5, EG6, EG8, and EG9 that are not the edges located between the members to be welded together. Thus, in the present embodiment, the workpiece point-cloud-data generating unit 23 removes the 3D point cloud data of the edges extracted by the edge extracting unit 22 from the 3D point cloud data acquired by the point-cloud-data acquiring unit 1 and generates a 3D point cloud data component of each of the plurality of workpieces on the basis of 3D point cloud data that is obtained by the removal. For example, the workpiece point-cloud-data generating unit 23 generates the 3D point cloud data components of the plurality of workpieces by subjecting the 3D point cloud data that has been obtained by the above removal to so-called clustering processing. In the clustering processing, for example, the K-means method, Euclidean clustering, density-based spatial clustering of applications with noise (DBSCAN), or the like is used. In the present embodiment, the Euclidean clustering is used. In the case illustrated in FIG. 2, 3D point cloud data components WK1 to WK3 of the first to third workpieces that are illustrated in FIG. 4 are generated.

The weld-line generating unit 24 generates weld lines for the plurality of workpieces on the basis of the 3D point cloud data components of the plurality of workpieces generated by the workpiece point-cloud-data generating unit 23.

More specifically, from the 3D point cloud data components of the plurality of workpieces, the distance between each two of end portions (the distance between each two of the edges in the case illustrated in FIG. 2) is evaluated so as to find end portions of the adjacent workpieces that are to be welded together, and a weld line is formed between each pair of the end portions. More specifically, the weld-line generating unit 24 performs, on all the pairs of the workpieces included in the 3D point cloud data components of the plurality of workpieces generated by the workpiece point-cloud-data generating unit 23, determination processing for selecting the 3D point cloud data of each pair of the workpieces from the 3D point cloud data components of the plurality of workpieces generated by the workpiece point-cloud-data generating unit 23 and determining any one of the selected pairs of workpieces as two adjacent workpieces having adjacent end portions when the distance between the end portions of the pair of workpieces is equal to or smaller than a predetermined threshold. Then, the weld-line generating unit 24 generates a weld line between the adjacent end portions of the two adjacent workpieces determined through the determination processing. The predetermined threshold is a threshold used for determining whether two end portions are adjacent end portions of a pair of adjacent workpieces, and accordingly, it is suitably set beforehand from a plurality of samples.

For example, in the case illustrated in FIG. 4, two 3D point cloud data components that are the 3D point cloud data component WK1 of the first workpiece and the 3D point cloud data component WK2 of the second workpiece are selected from the 3D point cloud data components WK1 to WK3 of the first to third workpieces, and in the four edges of the first workpiece and the four edges of the second workpiece, it is determined whether any one of the distances between all the pairs of end portions is equal to or smaller than the predetermined threshold. In the case of the first and second workpieces, as illustrated in FIG. 5, it is determined from the determination that a gap BL12 that is formed at the lower end of the first workpiece is a gap between adjacent end portions of two adjacent workpieces, and it is determined that the first workpiece and the second workpiece are two adjacent workpieces having adjacent end portions. Such determination processing is performed on another two 3D point cloud data components that are the 3D point cloud data component WK2 of the second workpiece and the 3D point cloud data component WK3 of the third workpiece and another two 3D point cloud data components that are the 3D point cloud data component WK3 of the third workpiece and the 3D point cloud data component WK1 of the first workpiece. As a result, it is determined that a gap BL23 that is formed at the lower end of the third workpiece is a gap between adjacent end portions of two adjacent workpieces, and it is determined that the second workpiece and the third workpiece are two adjacent workpieces having adjacent end portions. In addition, it is determined that a gap BL31 that is formed at the side end of the first workpiece is a gap between adjacent end portions of two adjacent workpieces, and it is determined that the third workpiece and the third workpiece are two adjacent workpieces having adjacent end portions. Then, the weld-line generating unit 24 generates a weld line for the gap BL12, a weld line for the gap BL23, and a weld line for the gap BL31.

More specifically, the weld-line generating unit 24 performs, on each pair of the adjacent workpieces determined through the determination processing, generating processing for generating candidate points of a weld line between end points of the end portion of one of the pair of workpieces and end points of the end portion of the other of the pair of workpieces each of which is closest to a corresponding one of the end points of the one workpiece and generating a fitting line that fits the generated candidate points as the weld line. The fitting line is, for example, a straight line, an arc, or a curve that is expressed by a high-order polynomial such as a quadratic function.

For example, in the case illustrated in FIG. 5, regarding end points P2 and P3 of adjacent end portions (edges) EL2 and EL3 of the second and third workpieces, which are adjacent to each other with the gap BL23 formed therebetween, as illustrated in FIG. 6, a candidate point MP of a weld line is generated between the end point P2 of the end portion EL2 of the second workpiece that is one of two adjacent workpieces, and the end point P3 of the end portion EL3 of the third workpiece that is the other of the two adjacent workpieces, the end point P3 being closest to the end point P2. In FIG. 6, the candidate point MP is generated at a position between the end point P2 of the end portion EL2 of the second workpiece and the end point P3 of the end portion EL3 of the third workpiece that is closest to the end point P2, the position being, for example, the center position (midpoint position) between these end points. Such processing is performed on each end point P2*j* of the end portion EL2 of the second workpiece, and a plurality of candidate points MP are generated in the gap BL23. Then, as illustrated in FIG. 7, a fitting line WL23 that fits these candidate points MP is generated as a weld line WL23. The first and second workpieces, which are adjacent to each other with the gap BL12 formed therebetween, are subjected to similar processing, and a plurality of candidate points MP are generated in the gap BL12 so as to generate a weld line WL12. The second and third workpieces, which are adjacent to each other with the gap BL23 formed therebetween, are subjected to similar processing, and a plurality of candidate points MP are generated in the gap BL31 so as to generate a weld line WL31.

The teaching-data generating unit 25 generates, on the basis of the weld lines generated by the weld-line generating unit 24, teaching data (motion data) for causing an articulated robot with a welding torch to operate by a commonly known method. More specifically, in the present embodiment, the teaching-data generating unit 25 generates teaching data by using a weld line that is selected from the weld lines, which have been generated by the weld-line generating unit 24, by an operator (a user) and a welding condition that is specified by the operator, stores the generated teaching data (motion data) into the storage unit 6, and outputs the generated teaching data (motion data) to the output unit 4 or the IF unit 5. For example, in the case where the output unit 4 is a display device, the teaching-data generating unit 25 causes the output unit 4 to display the weld lines generated by the weld-line generating unit 24, and the operator designates at least one of the weld lines displayed by the output unit 4 as a weld line to be used for teaching data by performing an input operation using the input unit 3 and inputs a welding condition such as, for example, the thickness of a workpiece to the input unit 3. The teaching-data generating unit 25 generates teaching data by using the weld line specified by the input unit 3 and the welding condition input to the input unit 3.

The control processing unit 2, the input unit 3, the output unit 4, the IF unit 5, and the storage unit 6 may be configured by, for example, a desktop personal computer, a laptop personal computer, a tablet personal computer, or the like.

Figure 8:
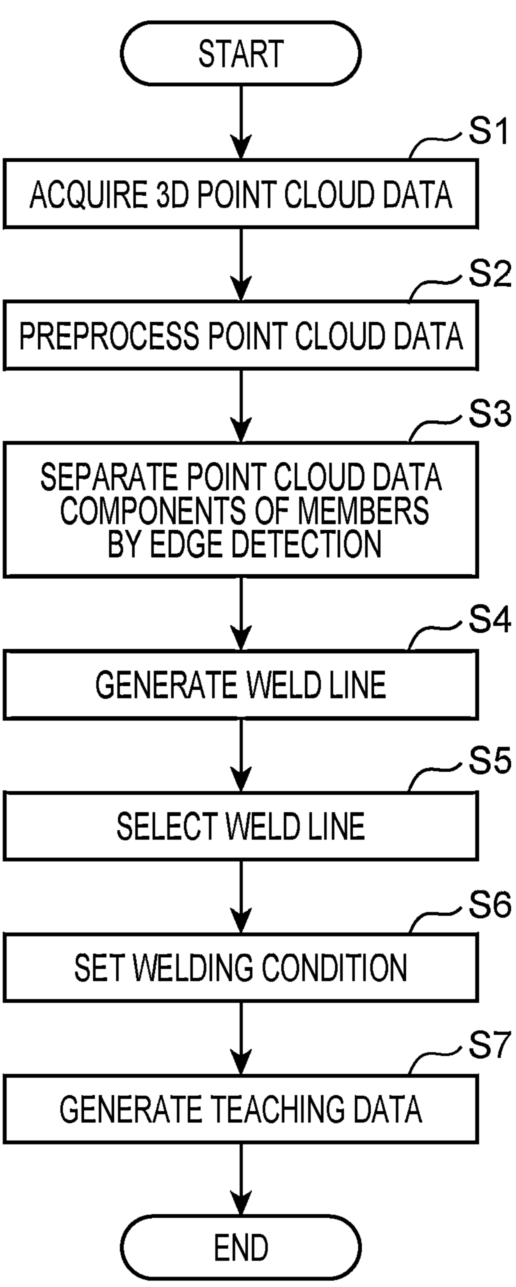
FIG. 8 is a flowchart illustrating an operation of the weld-line generating apparatus.

Operation of the weld-line generating apparatus according to the present embodiment will now be described. FIG. 8 is a flowchart illustrating an operation of the weld-line generating apparatus.

When the weld-line generating apparatus S having such a configuration is switched on, the weld-line generating apparatus S performs necessary initialization of each unit and starts its operation. As a result of executing the control processing program, the control unit 21, the edge extracting unit 22, the workpiece point-cloud-data generating unit 23, the weld-line generating unit 24, and the teaching-data generating unit 25 are functionally configured in the control processing unit 2.

In FIG. 8, for example, once an operator (a user) has input a command to start generation of a weld line to the input unit 3, the weld-line generating apparatus S first causes the point-cloud-data acquiring unit 1 to acquire 3D point cloud data of a plurality of workpieces that are to be welded together and that are arranged in a predetermined space and stores the 3D point cloud data into the storage unit 6 (S1).

Next, the weld-line generating apparatus S causes the edge extracting unit 22 of the control processing unit 2 to perform preprocessing on the 3D point cloud data acquired by the point-cloud-data acquiring unit 1 (S2).

Next, the weld-line generating apparatus S causes the edge extracting unit 22 of the control processing unit 2 to extract edges from the 3D point cloud data that has undergone preprocessing and causes the workpiece point-cloud-data generating unit 23 of the control processing unit 2 to generate a 3D point cloud data component of each of the plurality of workpieces on the basis of 3D point cloud data that is obtained by removing the 3D point cloud data of the edges extracted by the edge extracting unit 22 from the 3D point cloud data acquired by the point-cloud-data acquiring unit 1 in step S1 (S3).

Next, the weld-line generating apparatus S causes the weld-line generating unit 24 of the control processing unit 2 to generate weld lines for the plurality of workpieces on the basis of the 3D point cloud data components of the plurality of workpieces generated by the workpiece point-cloud-data generating unit 23 in step S3 (S4).

Next, the weld-line generating apparatus S causes the teaching-data generating unit 25 of the control processing unit 2 to receive a selection of a weld line that is used for teaching data (S5). More specifically, in the present embodiment, the teaching-data generating unit 25 causes the output unit 4 to display the weld lines generated by the weld-line generating unit 24 in step S4. The operator designates at least one of the weld lines displayed by the output unit 4 as a weld line to be used for teaching data by performing an input operation using the input unit 3. The teaching-data generating unit 25 stores the weld line specified by the input unit 3 as a weld line to be used for teaching data into the storage unit 6.

Next, the weld-line generating apparatus S causes the teaching-data generating unit 25 to receive an input of a welding condition that is used for teaching data (S6). More specifically, in the present embodiment, the operator inputs, after the designation of the weld line, a welding condition such as, for example, the thickness of a workpiece to the input unit 3. The teaching-data generating unit 25 stores the welding condition, which has been input to the input unit 3, as a welding condition to be used for teaching data into the storage unit 6.

Subsequently, the weld-line generating apparatus S causes the teaching-data generating unit 25 to generate teaching data by using the weld line specified by the input unit 3 in step S5 and the welding condition input to the input unit 3 in step S, stores the generated teaching data (motion data) into the storage unit 6, outputs the teaching data (motion data) to the output unit 4 or the IF unit 5, and terminates the processing.

As described above, according to the weld-line generating apparatus S in the present embodiment, the weld-line generating method employed by the weld-line generating apparatus S, and the weld-line generating program employed by the weld-line generating apparatus S, a weld line is generated on the basis of 3D point cloud data of a plurality of workpieces that are to be welded together, and thus, a weld line can be automatically generated without requiring three-dimensional (3D) CAD data.

The above-described weld-line generating apparatus S, the weld-line generating method, and the weld-line generating program can determine two adjacent workpieces having adjacent end portions and automatically generate a weld line.

The above-described weld-line generating apparatus S, the weld-line generating method, and the weld-line generating program can generate a weld line by a fitting line that fits each candidate point.

Note that, in the above-described embodiment, in the case where the fitting line includes an inflection point, the weld-line generating unit 24 separates the candidate points used for generating the fitting line into groups while the inflection point is serving as the boundary and generates, for each group, a fitting straight line that fits the candidate points included in the group as the weld line. The above-described weld-line generating apparatus S, the weld-line generating method, and the weld-line generating program regenerate a weld line as a plurality of weld lines by dividing a fitting line used for generating the weld line into portions at an inflection point, and thus, a more appropriate weld line according to the shape of an end portion of a workpiece can be generated.

In addition, in the above-described embodiment, although at least one of the weld lines generated by the weld-line generating unit 24 is designated and selected as a weld line that is actually used as a weld line, a function of assisting this selection may be provided.

For example, as indicated by a dashed line in FIG. 1, the weld-line generating apparatus S may further include a first weld-line excluding unit 26 that removes a weld line having a length that is equal to or smaller than a predetermined second threshold from the weld lines generated by the weld-line generating unit 24. In this case, for example, the second threshold may be suitably set beforehand. Alternatively, for example, an operator may input the second threshold by using the input unit 3. The first weld-line excluding unit 26 may use the second threshold that is suitably set beforehand or may use the second threshold received by the input unit 3. The above-described weld-line generating apparatus S, the weld-line generating method, and the weld-line generating program further includes the first weld-line excluding unit 26, and thus, a weld line that is unlikely to be used in actual welding can be eliminated.

For example, as indicated by another dashed line in FIG. 1, the weld-line generating apparatus S may further include a second weld-line excluding unit 27 that removes a weld line that is present outside a predetermined area from the weld lines generated by the weld-line generating unit 24. In this case, for example, an operator may input the area by using the input unit 3, and the second weld-line excluding unit 27 may use the area received by the input unit 3. The above-described weld-line generating apparatus S, the weld-line generating method, and the weld-line generating program further includes the second weld-line excluding unit 27, and thus, a weld line that is unlikely to be used in actual welding can be eliminated.

For example, as indicated by another dashed line in FIG. 1, the weld-line generating apparatus S may further include a weld-line integrating unit 28 that connects and integrates one of the weld lines generated by the weld-line generating unit 24 and the other of the weld lines generated by the weld-line generating unit 24 into a single weld line when the distance between a first end point of the one weld line and a second end point of the other weld line is equal to or smaller than a predetermined third threshold. In this case, for example, the third threshold may be suitably set beforehand. Alternatively, for example, an operator may input the third threshold by using the input unit 3. The weld-line integrating unit 28 may use the third threshold that is suitably set beforehand or may use the third threshold received by the input unit 3. The above-described weld-line generating apparatus S, the weld-line generating method, and the weld-line generating program further include the weld-line integrating unit 28, and thus, a more appropriate weld line can be generated.

Although the embodiment of the present invention has been appropriately and sufficiently described above with reference to the drawings in order to describe the present invention, it should be recognized that changes and improvements may easily be made to the above-described embodiment by those skilled in the art. Therefore, embodiments that are obtained by making changes and improvements to the above embodiment by those skilled in the art are considered to be included in the scope of the claims as long as they are within the scope of the present invention as described in the claims.

What is claimed is:

1. A weld-line generating apparatus comprising:

a point-cloud-data acquiring unit that acquires three-dimensional (3D) point cloud data of a plurality of workpieces that are to be welded together and that are arranged in a predetermined space, the point cloud data including data of the edges of said plurality of workpieces;

an edge extracting unit that extracts the 3D point cloud data of said edges from the 3D point cloud data acquired by the point-cloud-data acquiring unit;

a workpiece point-cloud-data generating unit that generates a 3D point cloud data component of each of the plurality of workpieces based on 3D point cloud data that is extracted by the edge extracting unit from the 3D point cloud data acquired by the point-cloud-data acquiring unit; and a weld-line generating unit that generates weld lines for the plurality of workpieces based on the 3D point cloud data components of the plurality of workpieces generated by the workpiece point-cloud-data generating unit, wherein the weld-line generating unit performs, on all the pairs of the workpieces included in the 3D point cloud data components of the plurality of workpieces generated by the workpiece point-cloud-data generating unit determination processing for selecting the 3D point cloud data of each pair of the workpieces from the 3D point cloud data components of the plurality of workpieces generated by the workpiece point-cloud-data generating unit and determining any one of the selected pairs of workpieces as two adjacent workpieces having adjacent end portions when a distance between the end portions of the pair of workpieces is equal to or smaller than a predetermined threshold and generates the weld line between the adjacent end portions of the two adjacent workpieces determined through the determination processing.

2. The weld-line generating apparatus according to claim 1, wherein the weld-line generating unit performs, on each pair of the adjacent workpieces determined through the determination processing, generating processing for generating candidate points of a weld line between end points of an end portion of one of the pair of workpieces and end points of an end portion of another one of the pair of workpieces each of which is closest to a corresponding one of the end points of the one workpiece and generating a fitting line that fits the generated candidate points as the weld line.

3. The weld-line generating apparatus according to claim 2, wherein, when the fitting line includes an inflection point, the weld-line generating unit separates the candidate points used for generating the fitting line into groups while the inflection point is serving as a boundary and generates, for each group, a fitting straight line that fits the candidate points included in the group as the weld line.

4. A weld-line generating apparatus comprising:

a point-cloud-data acquiring unit that acquires three-dimensional (3D) point cloud data of a plurality of workpieces that are to be welded together and that are arranged in a predetermined space, the point cloud data including data of the edges of said plurality of workpieces;

an edge extracting unit that extracts the 3D point cloud data of said edges from the 3D point cloud data acquired by the point-cloud-data acquiring unit;

a workpiece point-cloud-data generating unit that generates a 3D point cloud data component of each of the plurality of workpieces based on 3D point cloud data that is extracted by the edge extracting unit from the 3D point cloud data acquired by the point-cloud-data acquiring unit; and a weld-line generating unit that generates weld lines for the plurality of workpieces based on the 3D point cloud data components of the plurality of workpieces generated by the workpiece point-cloud-data generating unit, further comprising:

a weld-line excluding unit that removes a weld line having a length that is equal to or smaller than a predetermined second threshold length from weld lines generated by the weld-line generating unit.

5. The weld-line generating apparatus according to claim 1, further comprising:

a second weld-line excluding unit that removes a weld line that is present outside a predetermined area from weld lines generated by the weld-line generating unit.

6. A weld-line generating apparatus comprising:

a point-cloud-data acquiring unit that acquires three-dimensional (3D) point cloud data of a plurality of workpieces that are to be welded together and that are arranged in a predetermined space, the point cloud data including data of the edges of said plurality of workpieces;

an edge extracting unit that extracts the 3D point cloud data of said edges from the 3D point cloud data acquired by the point-cloud-data acquiring unit;

a workpiece point-cloud-data generating unit that generates a 3D point cloud data component of each of the plurality of workpieces based on 3D point cloud data that is extracted by the edge extracting unit from the 3D point cloud data acquired by the point-cloud-data acquiring unit; and a weld-line generating unit that generates weld lines for the plurality of workpieces based on the 3D point cloud data components of the plurality of workpieces generated by the workpiece point-cloud-data generating unit, further comprising:

a weld-line integrating unit that connects and integrates one of weld lines generated by the weld-line generating unit and another one of the weld lines generated by the weld-line generating unit into a single weld line when a distance between a first end point of the one weld line and a second end point of the other weld line is equal to or smaller than a predetermined third threshold.

* * * * *